US00RE43798E

(19) United States
(12) Reissued Patent
Hansen

(10) Patent Number: US RE43,798 E
(45) Date of Reissued Patent: Nov. 6, 2012

(54) CONFIGURABLE CACHE ALLOWING CACHE-TYPE AND BUFFER-TYPE ACCESS

(75) Inventor: Craig C. Hansen, Los Altos, CA (US)

(73) Assignee: Microunity Systems Engineering, Inc., Los Altos, CA (US)

(21) Appl. No.: 11/606,321

(22) Filed: Nov. 30, 2006

Related U.S. Patent Documents

Reissue of:
(64) Patent No.: 6,427,190
Issued: Jul. 30, 2002
Appl. No.: 09/570,402
Filed: May 12, 2000

U.S. Applications:
(63) Continuation of application No. 10/901,482, filed on Jul. 29, 2004, now Pat. No. Re. 39,500, which is a continuation of application No. 08/541,416, filed on Oct. 10, 1995, now Pat. No. 6,101,590.

(51) Int. Cl.
*G06F 12/06* (2006.01)
(52) U.S. Cl. ..... 711/129; 711/170; 711/173; 711/203
(58) Field of Classification Search ..... None
See application file for complete search history.

(56) References Cited

U.S. PATENT DOCUMENTS

| | | | | |
|---|---|---|---|---|
| 3,938,097 | A * | 2/1976 | Niguette, III | 711/128 |
| 4,442,484 | A | 4/1984 | Childs, Jr. et al. | 711/163 |
| 4,580,240 | A | 4/1986 | Watanabe | |
| 4,985,825 | A | 1/1991 | Webb, Jr. et al. | |
| 5,067,078 | A | 11/1991 | Talgam et al. | |
| 5,091,846 | A | 2/1992 | Sachs et al. | |
| 5,132,927 | A | 7/1992 | Lenoski et al. | |
| 5,179,675 | A | 1/1993 | Cole et al. | |
| 5,222,223 | A | 6/1993 | Webb, Jr. et al. | |
| 5,226,133 | A | 7/1993 | Taylor et al. | 711/207 |
| 5,319,760 | A | 6/1994 | Mason et al. | 711/208 |
| 5,390,310 | A | 2/1995 | Welland | 711/203 |
| 5,410,669 | A | 4/1995 | Biggs et al. | |

(Continued)

FOREIGN PATENT DOCUMENTS

EP 0 497 600 A2 8/1992

OTHER PUBLICATIONS

"Organization of the Motorola 88110 Superscalar RISC Microprocessor", Diefendorff et al, 1992, p. 40-63.*

(Continued)

*Primary Examiner* — Than Nguyen
(74) *Attorney, Agent, or Firm* — Buchanan Ingersoll & Rooney PC

(57) ABSTRACT

A virtual memory system including a local-to-global virtual address translator for translating local virtual addresses having associated task specific address spaces into global virtual addresses corresponding to an address space associated with multiple tasks, and a global virtual-to-physical address translator for translating global virtual addresses to physical addresses. Protection information is provided by each of the local virtual-to-global virtual address translator, the global virtual-to-physical address translator, the cache tag storage, or a protection information buffer depending on whether a cache bit or miss occurs during a given data or instruction access. The cache is configurable such that it can be configured into a buffer portion or a cache portion for faster cache accesses.

17 Claims, 6 Drawing Sheets

U.S. PATENT DOCUMENTS

| | | | | | |
|---|---|---|---|---|---|
| 5,420,998 | A | | 5/1995 | Horning | |
| 5,423,019 | A | | 6/1995 | Lin | |
| 5,430,888 | A | | 7/1995 | Witek et al. | |
| 5,446,861 | A | | 8/1995 | Idleman et al. | |
| 5,557,769 | A | * | 9/1996 | Bailey et al. | 711/146 |
| 5,586,293 | A | | 12/1996 | Baron et al. | |
| 5,619,673 | A | | 4/1997 | Wang | |
| 5,822,762 | A | | 10/1998 | Nishida et al. | |
| 6,000,012 | A | * | 12/1999 | Freerksen et al. | 711/118 |
| 6,101,590 | A | * | 8/2000 | Hansen | 711/203 |
| 6,484,237 | B1 | | 11/2002 | Agarwala et al. | |
| 6,606,686 | B1 | | 8/2003 | Agarwala et al. | |

OTHER PUBLICATIONS

MC88110 Second Generation RISC Microprocessor User's Manual, Motorola Inc., 1991. p. 1-626.*

Non-Final Office Action dated Dec. 22, 2006 in a Reexamination No. 90/007,563.

Amendment dated Feb. 22, 2007 in a Reexamination No. 90/007,563.

Interview Summary dated Jun. 22, 2007 in a Reexamination No. 90/007,563.

Final Office Action dated Sep. 1, 2007 in a Reexamination No. 90/007,563.

Amendment dated Nov. 1, 2007 in a Reexamination No. 90/007,563.

Interview Summary dated Jul. 31, 2008 in a Reexamination No. 90/007,563.

Amendment dated Dec. 1, 2008 in a Reexamination No. 90/007,563.

Final Office Action dated May 22, 2009 in a Reexamination No. 90/007,563.

Amendment dated Jun. 26, 2009 in a Reexamination No. 90/007,563.

Notice of Intent to Issue a Reexam Certificate dated Aug. 21, 2009 in a Reexamination No. 90/007,563.

Diefendorff et al., "Organization of the Motorola 88110 Superscalar RISC Microprocessor", IEEE Micro, Apr. 1992.

Defendants' Exhibit Q Chart from *MicroUnity Systems Engineering, Inc.* v. *Acer, Inc. et al.,* Case No. 2:10-CV-91 filed Mar. 16, 2010, Eastern District of Texas, Marshall Division.

R. H. Katz et al., "Implementing a Cache Consistency Protocol," Computer Science Division, Electrical Engineering and Computer Science Dept., 1985, pp. 1-31.

Motorola, Inc., MC88200 Cache/Memory Management Unit User's Manual, 1988, 261 pages.

David A. Wood et al., "Supporting Reference and Dirty Bits in Spur's Virtual Address Cache," Computer Science Division, Electrical Engineering and Computer Science Dept., 1989, pp. 122-130.

Schroder et al., "A Hardware for Implementing Protection Rings", Communications of the ACM, Mar. 1972, vol. 15, No. 3.

* cited by examiner

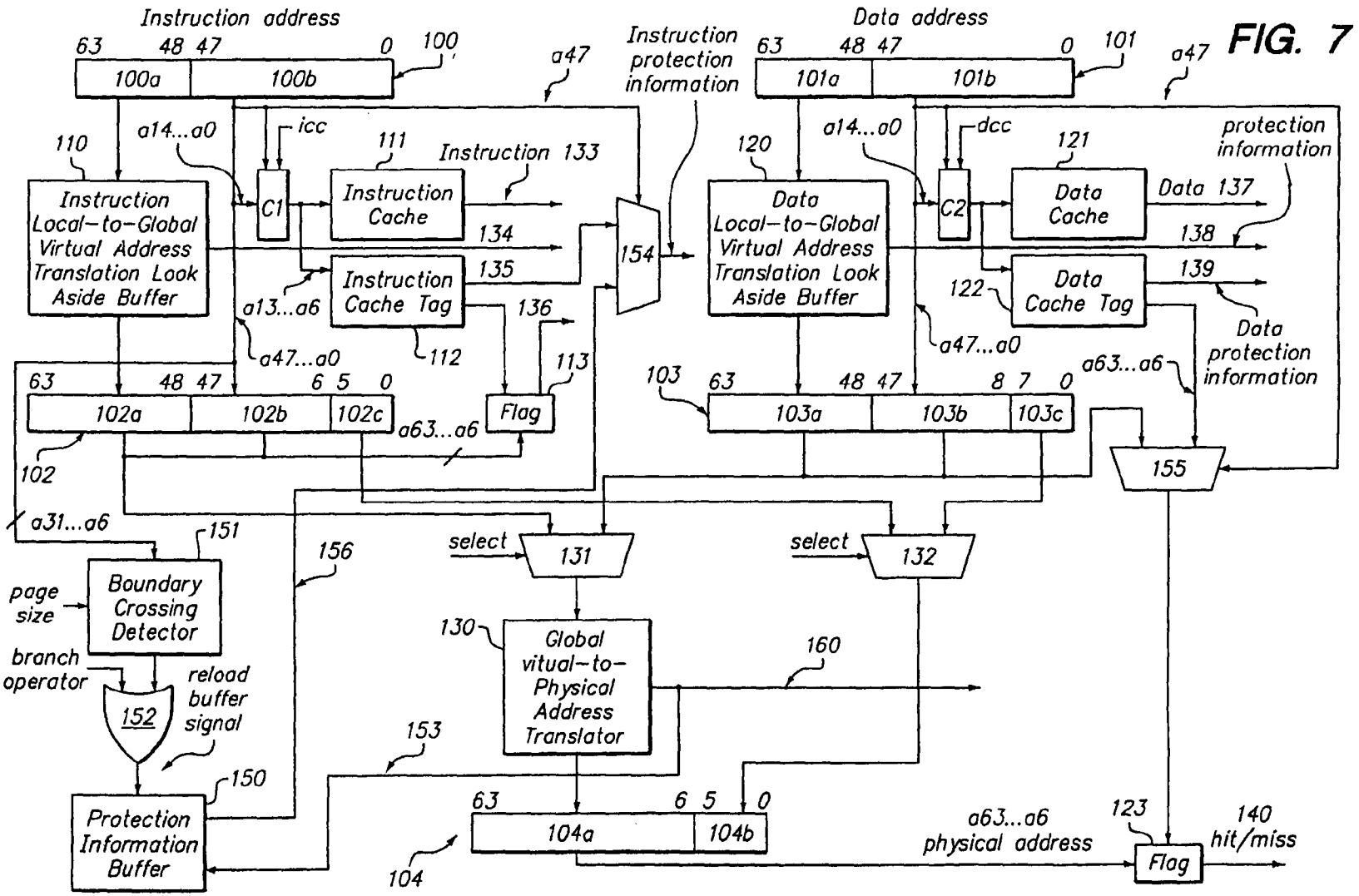
FIG. 7
Instruction address
Data address
Instruction protection information
protection information
Data protection information
Instruction Local-to-Global Virtual Address Translation Look Aside Buffer
Data Local-to-Global Virtual Address Translation Look Aside Buffer
Instruction Cache
Instruction Cache Tag
Data Cache
Data Cache Tag
Flag
Boundary Crossing Detector
Global vitual-to-Physical Address Translator
Protection Information Buffer
reload buffer signal
page size
branch operator
a63...a6 physical address
140 hit/miss
select
icc
dcc
a14...a0
a47...a0
a13...a6
a63...a6
a31...a6
100a
100b
101a
101b
102a
102b
102c
103a
103b
103c
104a
104b
110
111
112
113
120
121
122
123
130
131
132
133
134
135
136
137
138
139
150
151
152
153
154
155
156
160

CONFIGURABLE CACHE ALLOWING CACHE-TYPE AND BUFFER-TYPE ACCESS

Matter enclosed in heavy brackets [ ] appears in the original patent but forms no part of this reissue specification; matter printed in italics indicates the additions made by reissue.

[This application is a continuation of application Ser. No. 08/541,416, filed Oct. 10, 1995, now U.S. Pat. No. 6,101, 590.] *Multiple reissue applications have been filed for U.S. Pat. No. 6,427,190. This reissue is a continuation of Reissue application Ser. No. 10/901,482, filed Jul. 29, 2004 now U.S. Pat. No. Re. 39,500. The original U.S. Pat. No. 6,427,190 is a continuation of application Ser. No. 08/541,416, filed Oct. 10, 1995, now U.S. Pat. No. 6,101,590.*

FIELD OF THE INVENTION

The present invention relates to computer memory systems and particularly to virtual memory systems.

BACKGROUND OF THE INVENTION

In order to enhance performance and utility in a computer system a technique called virtual memory is frequently used. One motivation for using virtual memory is to allow multiple programs to simultaneously share a computer system's main memory. This is achieved by allocating individual portions (referred to as blocks or segments) of the main memory to each of the programs being run (also referred to as a tasks). Virtual memory systems are also used in cases when a single program is too large to fit into main memory. In this case, portions of the program are stored in secondary memory and the virtual memory system assists in retrieving these portions from the secondary memory.

Virtual memory is implemented by using virtual addresses at the task or program level—each task having its own set of independent addresses. When a program performs a memory access, the virtual addresses are translated into physical addresses that may or may not be the same as other physical addresses for other tasks. The translation may be successful, leading to an access to main memory using that physical address. The translation may be unsuccessful, indicating that physical, or main memory has not been allocated for that virtual address, leading to a processor exception, from which the program may be aborted or physical memory may be allocated and the task restarted. To enhance the translation performance, virtual addresses are translated to physical addresses using information stored in a translation lookaside buffer (TLB), also known as a translation cache. The TLB provides the information that defines the mapping for each of the virtual addresses.

There are basically two categories of virtual memory systems presently utilized: paging and segmentation. Paging systems typically use fixed size blocks for allocating memory to processes. Segmentation, in contrast uses variable size blocks which may range from a value as small as one byte. Paging suffers from the disadvantage that sections of contiguous physical memory become unused because the page size is fixed: this is known as internal fragmentation. Segmentation, on the other hand, has disadvantages that the variable-sized segments may create unused regions of memory as segments are allocated, deallocated, and reallocated in arbitrary order, leaving holes in the consecutive memory allocation which become unused or unusable because they are not of a suitable size. A hybrid of the two categories has been employed in prior art systems in which segmentation and paging are both employed together.

Virtual memory systems may also employ a memory cache system to minimize virtual memory misses which includes a cache data storage and its corresponding cache tag storage. The cache stores recently accessed data and the tag storage stores a portion of the virtual address or physical address, providing the means by which it can be determined whether the cache contains the requested address. Only a portion of the address is usually required because the remaining portion of the address is used to locate (index) a reference within the cache data and tag storage, and so need not be checked again.

Caches may use either a virtual or physical address to index the cache, known as a virtual-index cache or a physical-index cache. Additionally, caches may use either a virtual or physical address stored and compared against in the cache tag storage, known as a virtual-tag cache or a physical-tag cache. Virtual-index and virtual-tag caches are generally able to attain higher peak performance, but add constraint to the mapping of addresses available when sharing data or changing the address mapping. In particular, the problem called aliasing occurs, in which two tasks use different virtual addresses to reference the same physical memory. Aliasing may require that tasks sharing memory space use identical or similar virtual addresses.

Since virtual memory allows two processes to share the same portion of physical memory such that each of the processes' virtual memory are mapped to different addresses, it is necessary to implement a protection scheme that prevents one task (i.e. a set of program instructions) from modifying a portion of memory, unless specifically allowed. Typically, tasks are assigned privilege levels which indicate the task's its ability to modify areas within physical memory and establish a control hierarchy, where higher privileged tasks are able to manipulate the storage of lower privileged tasks, including the possibility of higher privileged tasks manipulating the state of the virtual memory system itself.

One implementation of a protection scheme presently employed by virtual memory systems are "gateways" or "call gates" that function to provide a given task limited access privilege to areas in the physical memory having higher privilege than the task. The disadvantages of this prior art gateway implementation is that they utilize the CPU's status register requiring additional instructions in order to modify the status registers, and fail to provide securely initialized machine state, requiring additional instructions to initialize CPU registers used to access privileged memory registions. As a result, prior art gateway methods tend to reduce overall system performance by increasing execution times.

The present invention is a virtual memory system that performs virtual address-to-physical address translations in a manner that increases the overall efficiency and flexibility of the virtual memory system.

SUMMARY OF THE INVENTION

A virtual memory system that functions to translate a task specific virtual address (referred to as a local virtual address) into a virtual address that is generalized to all or a group of tasks (referred to as a global virtual address) and then translates the global virtual address into an address which points to a block of physical memory, (referred to as the physical address) is described. A first embodiment of the virtual memory system of the present invention includes a local-to-global virtual address translator for translating the local virtual address into the global virtual address and a global virtual-to-physical address translator for translating the global virtual address into the physical address. In an alternate embodiment, separate local-to-global virtual address translators are used for translating each of the data and instruction access addresses.

In one embodiment of the present invention, the local-to-global virtual address translator and the global virtual-to-physical address translator each include a plurality of cells, each cell implementing a single entry in a translation lookaside buffer (TLB) which defines a particular address space mapping. The TLB entry includes a match field, a mask field, an XOR field, and a protection field. Each cell includes a first logic means for matching the input address to be translated with the contents of the cell's match field to generate a match indicator output signal, a second logic means for masking the match indicator output signal with the contents of the cell's mask field to generate a masked output signal, a third logic means for generating a select signal if all of the signals mating up the masked output signal are at the same logic level, a fourth logic means for outputting the cell's XOR value if the cell is selected, and a fifth logic means for providing a protection signal when the cell is selected. Each of the translators also includes a means for multiplexing all of the XOR values from each cell and outputting the XOR value of the selected cell and a second means for multiplexing all of the protection information from each cell and outputting the protection information of the selected cell. Further, each of the translators includes a logic means for combining the XOR value from the selected cell with the address to be translated, using a bitwise exclusive-or operation to generate the translated address (either global virtual address or physical address).

In another embodiment, the local-to-global virtual address translator comprises a single cell. In this case, all of the local virtual addresses are translated by the one cell and thus this embodiment of the local-to-global virtual address translator does not require the first and second multiplexers.

The local-to-global virtual address translator, the global virtual-to-physical (GV/P) address translator and a cache tag storage provide protection information for each instruction or data access. The protection information includes the task privilege for the given access. The address's protection information is passed to the processor and is checked with the protection information associated with the corresponding local virtual, global virtual, or physical memory area that the address is attempting to access.

The present invention utilizes gateways to allow a given address to access high privilege areas of memory at certain entry points. A gateway instruction includes a gateway operation code and the gateway operation's privilege level in its protection information. The gateway instruction also provides an address that points to the gateway for the gateway operation. The gateway is a register that stores the gateway entry pointer and a data register pointer. The gateway operation comprises several steps which include storing the address of the gateway entry pointer in the processor program counter, storing the contents of the previous value stored in the program counter in a first register, initializing a second register with data to be used in the operation, performing the gateway operation, reloading the contents of the first register into the program counter.

The virtual memory system also includes a cache and a tag structure. The cache stores the accessed data or instruction that was recently retrieved by a previously translated virtual address. In one embodiment of the present invention a separate cache and tag system is used for each of the data and instruction accesses. In this embodiment, if an instruction access is being performed, the instruction cache tag utilizes the virtual address's corresponding global virtual address to tag the instruction stored in the virtual instruction cache. If a data access is being performed, the data cache tag utilizes the virtual address's corresponding physical address to tag the data stored in the virtual data cache.

The virtual cache structure also employs a means for determining whether a local virtual address cache hit or miss has occurred. If a cache hit occurs, the data in the virtual cache is accessed and the access operation is complete. If a cache miss occurs, the global virtual address is passed to the global virtual-to-physical address translator where it is translated into a physical address. The physical address is then used to access the data from either main memory or secondary memory.

BRIEF DESCRIPTION OF THE DRAWINGS

FIG. 7 illustrates another embodiment of the virtual memory system of the present invention having independent data address and instruction address local-to-global virtual translation buffers and independent data and instruction cache systems.

DETAILED DESCRIPTION

A virtual memory system is described. In the following description, numerous specific details are set forth, such as cache size, address field size and bus widths etc., in order to provide a thorough understanding of the present invention. It will be obvious, however, to one skilled in the art that these specific details need not be employed to practice the present invention. In other instances, well-known memory system structures have not been described in detail in order to avoid unnecessarily obscuring the present invention.

Overview of the Virtual Memory System

Figure 1:
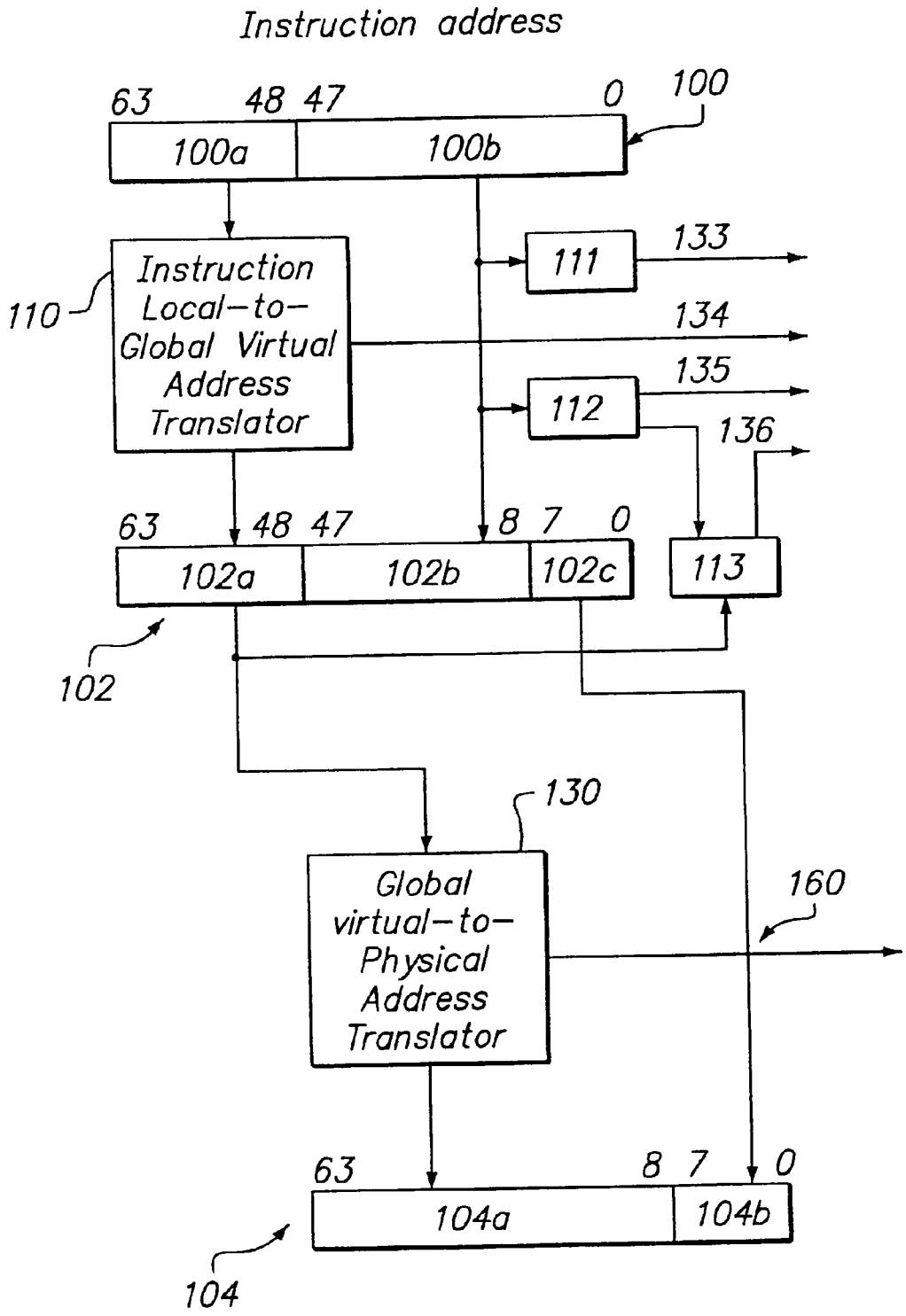
FIGS. 1 shows one embodiment of the block diagram of the virtual memory system of the present invention.

FIG. 1 shows a block diagram of one embodiment of the virtual memory system of the present invention. FIG. 1 shows an address represented in three address forms: local virtual address 100, global virtual address 102, and physical address 104. The local virtual address for a given task is a virtual address that is specific to that given task. The global virtual address is also a virtual address. However, the global virtual address is an address that resides in a virtual memory space that is common to a large group of the tasks. In one embodiment of the present invention, there is only one global virtual memory space. In another embodiment, there are several global virtual memory spaces. The physical address indicates the actual location of the address within the physical memory when it is present in the main memory.

FIG. 1 shows a 64-bit local virtual instruction address 100 comprising two portions 100a and 100b. Portions 100a and 100b correspond to the 16 and 48 bit portions of the address, respectively.

FIG. 1 also shows a local-to-global virtual address translator 110 for translating local virtual address 100. As illustrated, the higher order 16 bits of address 100, i.e. portion 100a, are coupled to the local-to-global virtual translator. Portion 100a defines a large area (referred to as a block) of virtual memory space allocated to a specific task. The lower 48 bits of address 100, (portion 100b) are the offset bits of the local virtual address. Portions 100b points to a specific area within the block.

Local-to-global virtual address translation is performed by mapping the higher order 16 bit portions 100a of local virtual address 100 to 16 bit portions 102a of global virtual address 102. As shown in FIG. 1, translator 110 outputs the 16 higher order bits (102a) of global virtual address 102. The lower order 48 bits of address 100 (i.e. 100b) are passed directly to the lower order 48 bits of global virtual address 102 (designated as portions 102b and 102c).

Global virtual-to-physical address translation is performed by translator 130. The higher order 58 bits of global virtual address 102 (i.e. portions 102a and 102b) are coupled to translator 130. Translator 130 maps the 58 bits of the selected global virtual address to 58 bits of a physical address. Portion 104a in physical address 104 corresponds to the translated 58 higher order bits of the global virtual address. The 6 lower bits of address 102 (i.e. portion 102c) are coupled to the 6 lower order bits of address 104 (i.e. portion 104b).

FIG. 1 also shows a cache storage 111 and its corresponding cache tag 112. The cache and tags are virtual-indexed and virtual-tagged to facilitate reducing memory access times. The cache storage stores the data corresponding to recently accessed virtual addresses. The cache tag stores global-virtual addresses corresponding to the data stored in the cache storage.

When an address accesses the virtual memory system shown in FIG. 1, the system performs three tasks simultaneously. First, the lower order 48 bits (i.e. the offset) of the local virtual instruction address is coupled to virtual cache 111 to access a block of data in the cache. In one embodiment of the present invention, a 32K byte cache is employed, having 512 blocks with 64 bytes each. The block of data accessed from cache 111 is coupled to the cache's data bus 133 and transmitted to the CPU. Second, while the cache is being accessed, local virtual address 100 is translated into a global virtual address 102. This is performed as described above. Third, portion 100b is coupled to cache tag 112 to access the index corresponding to the accessed cache data. The accessed index is coupled to a tag compare unit 113 to determine if it matches with the higher order 52 bits of the global virtual instruction address, portion 102a and 102b. If it does, a cache hit occurs. This means that the block of data stored in cache 111 is the desired data that corresponds to the original local virtual address. The cache hit indicator is transmitted to the processor on bus 136 and indicates to the processor that the data transmitted on the cache bus is valid. Protection information from cache tag 112 is coupled to the processor on bus 135. At this point global virtual-to-physical address translation is not necessary since valid data has been transmitted to the CPU.

If a cache miss occurs, (i.e. the accessed index provided by the cache tag does not match the higher order 52 bits in the global virtual instruction address), a cache miss is transmitted to the CPU on bus 136 indicating that the data sent on data bus 133 is not valid—at which time the CPU discards the data sent by the cache and the global virtual address is translated into a physical address. If the translation is successful, as indicated by translation hit and protection information 160, the physical address is then used to access the physical memory and the data return from memory is written into the cache storage 111 and the global-virtual address 102 and protection information 160 is written into cache tag 112. If the translation is unsuccessful, an exception is indicated to the CPU, and the physical memory access may not occur.

Physical-Tagged Caches

It should be noted that in one embodiment of the present invention, the type of addresses stored in the cache tag 112 is a physical address that can be used to access the physical memory. In such an embodiment, tag compare unit 113 is coupled to physical address 104 instead of global virtual address 102. Because a virtual-index cache is employed, the portion of the physical address which must be stored in cache tag 112 is larger and therefore a more limited set of protection information is stored in cache tag 112 and transmitted to the processor on bus 135. This information is supplemented by protection information 160 from the global virtual to physical translator 130.

Employing physical address indexes in the cache tag facilitates memory operations such as writing data out of the cache storage 111 and into physical memory when data is modified in the cache in order to retain data consistency. Another reason for using physical address indexes in the cache tag 112 is to facilitate purging data from the cache in order to make room for recently accessed memory storage. In both of these situations, since the cache tag stores physical address indexes, the data can be written into the physical memory without going through a global virtual-to-physical address translation. It should be apparent that the type of address (virtual or physical) stored in the cache tag is chosen so as to optimize the overall accessing operations in the memory system.

Separate Instruction and Data Caches

In the embodiment shown in FIG. 1, the memory system employs a single path to perform both data and instruction accesses. In another embodiment (shown in FIG. 7), both instruction memory accesses and data memory accesses are performed using partially separated paths. These accesses are each separately cached by multiple instances of cache storage, cache tag, and tag compare unit. In this embodiment, the instruction cache is virtual-indexed and virtual-tagged, and the data cache is virtual-indexed and physically-tagged. Local-virtual to global-virtual address translation is accomplished by two instances of the local-virtual to global-virtual translator. These multiple instances may be made to appear as if a single translator is shared by initializing and writing the same data and control information to each instance of the translator.

For instance, referring to FIG. 7, the instruction access path includes a local-to-global virtual address translator 110, an instruction cache 111, an instruction cache tag 112, and cache hit/miss flag 113 and the data access path includes a separate local-to-global virtual address translator 120, a data cache 121, a data cache tag 122, and a cache hit/miss flag 123. It should be understood that the above-mentioned instruction and data access path elements correspond to and function similarly to the access path elements (i.e. translator 110, cache 111, cache tag 112, and flag 113) shown in FIG. 1. Furthermore, buses 133 and 137 (FIG. 7) correspond to bus 133 (FIG. 1) in that they provide the cached instruction or data to the CPU, buses 134 and 138 correspond to bus 134 (FIG. 1) in that they provide the protection information from the local-to-global virtual address translator, buses 135 and 139 (FIG. 7) correspond to bus 135 (FIG. 1) in that they provide protection information from the cache tag, and buses 136 and 140 (FIG. 7) correspond to bus 136 (FIG. 1) in that they provide a signal to the CPU to indicate whether a cache hit or miss has occurred.

It should also be understood that since the global virtual-to-physical address translator 130 is shared between paths multiplexers 131 and 132, controlled by path select signals, are employed to route the global virtual instruction or data addresses through the shared path.

In an alternate embodiment of the present invention, local-to-global virtual address translation for both of the instruction and data addresses is performed by a single, shared translator.

Address Translation

The virtual instruction or data address is referred to as local since it belongs to a virtual address space that is unique to one specific task. Generally, in a computer system that performs multiple tasks, each task in the system has a unique local virtual address space. Accordingly, in one method of the present invention for performing local-to-global virtual translation, each of the local virtual address spaces are mapped into a common global virtual address space. An alternative embodiment, is that the local virtual address spaces are mapped into more than one global virtual address space.

Figure 2:
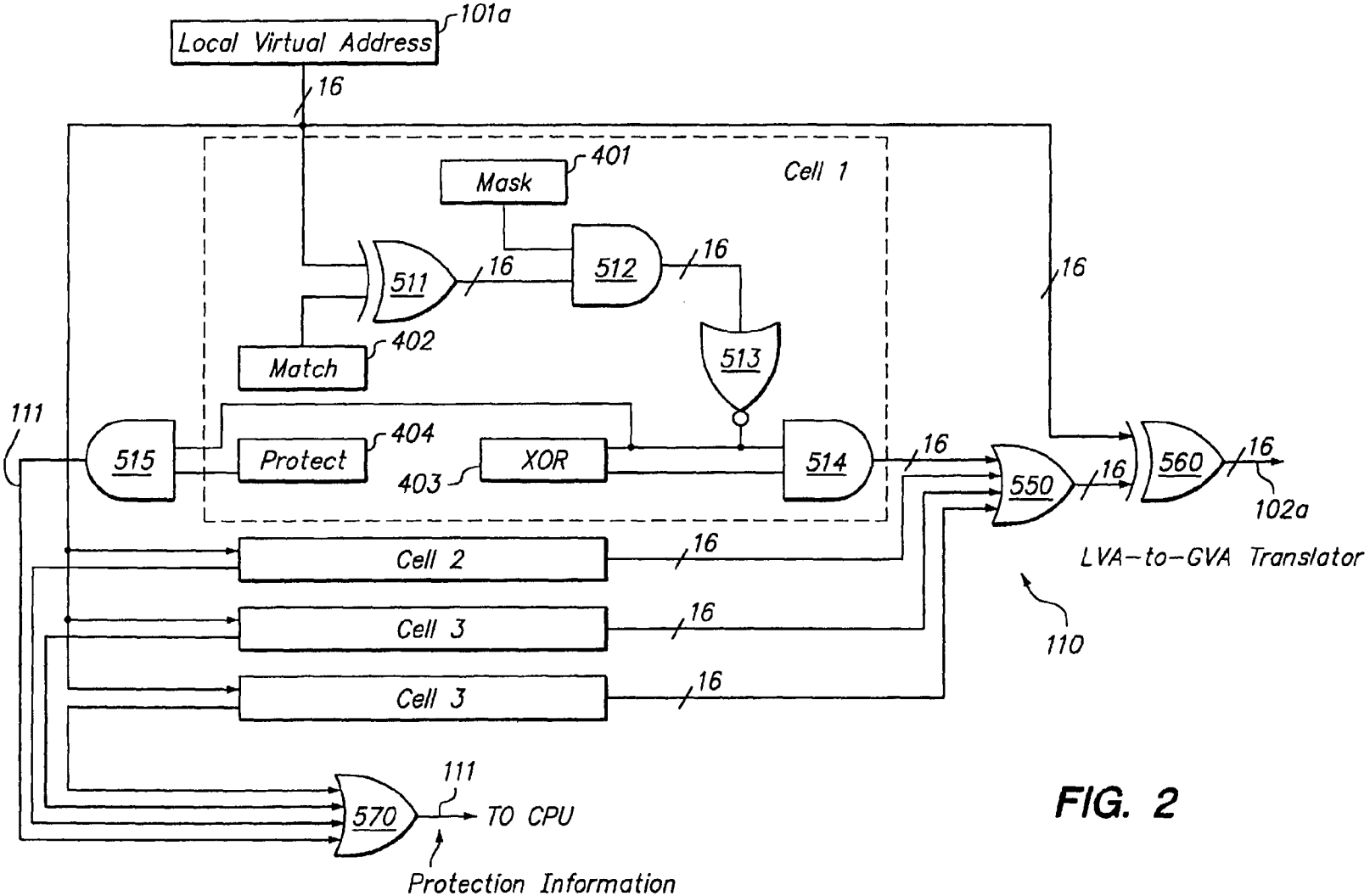
FIG. 2 illustrates an embodiment of the local virtual-to-global translator 110 of the present invention.

FIG. 2 illustrates the local-to-global virtual address translator 110 of the present invention having four translator cells 1-4. Each translator cell comprises exclusive OR (XOR) logic gate 511 having a first parallel input coupled to the highest order 16 bits of the local virtual address (instruction or data) and a second parallel input coupled to register 402. Register 402 stores a 16 bit match value. Logic gate 511 is used to perform a bit-by-bit comparison between the higher order 16 bits from the local virtual address and the 16 bit match value. If the match value is the same as the 16 bits from the local virtual address, the XOR gate 511 outputs 16 bits that are all 0's—indicating a match. In the case in which bits differ, gate 511 outputs a "1" for the mis-matched bit locations and "0"'s for the matched bit locations. A non-zero match indicator signal from XOR gate 511 indicates a mis-match.

The 16 bit match indicator output signal from XOR gate 511 is coupled to a first parallel input of AND gate 512. The second parallel input is coupled to 16 bit mask register 401. The mask register is used to mask out certain of the 16 bits that are non-zero. The two parallel inputs of AND gate 512 are bit-by-bit ANDed together. If all of the 16 bits from XOR gate 511 are zero, then the output of AND gate 16 will also be zero no matter what the mask value is. If any of the bits from XOR gate 511 are non-zero, the mask may be employed to mask these out so that the output of AND gate 512 is 16 bits of all zeros. However, if any of the bits from AND gate 512 are non-zero and they are not masked out by mask 401 then no match occurs and the 16 bit masked output signal of AND gate 512 will contain a "1". The 16 bits from AND gate 512 are coupled to NOR gate 513 and are NORed together. If all of the 16 bits are zero, NOR gate 513 outputs a "1" indicating that the cell is selected. If any of the 16 bits are non-zero, NOR gate 513 outputs a "0" indicating that the cell is not selected. The select signal is ANDed with each of the values in XOR register 403. If the select signal is a 1, indicating that the cell is selected, then AND gate 514 outputs the contents of XOR register 403. If the select signal is a 0, indicating the cell is not selected, AND gate 514 outputs a 16 bit word of "0"s.

FIG. 2 also shows three other cells (cells 2-4)—each cell determining whether a match exists between the 16 bits of local virtual address and match register 402. Only one of the cells will match the local virtual address at a time. Thus, only one of the cells outputs the 16 bit contents of their corresponding XOR register 403 and the rest output 16 bits of "0"s. Each of the 16 bits of each cell are ORed with the corresponding bits from the other cells (all at a "0" logic level) by OR gate 550 causing gate 550 to output the contents of the XOR value from the selected cell. This value is then XORed with the higher order 16 bits from the original local virtual address being translated by gate 560 to generate the global virtual address.

The select signal from the output of NOR gate 513 is also coupled to one input of AND gate 515. The other input of gate 515 is coupled to register 404 which contains the protection information for the global virtual address space defined by cell 1. In the event the select signal is a "1", AND gate 515 passes the content of the protection register 404 to one input of OR gate 570. If the select signal is a "0", then AND gate 515 outputs all "0"s. Since only one cell is selected at a time, gate 570 outputs protection information from only one cell. In other words, OR gate 570 outputs the protection information from the selected cell. This information is then transmitted to the CPU on bus 111.

It should be noted that an alternative space conservative embodiment of the present invention translator 110 comprises a single cell 1. In this embodiment, the match register is all "0"s and the mask register is all "1"s so that they become ineffective. As a result, all of the local virtual addresses are translated by the single cell having a mapping defined by the XOR register 403 in that cell. Also, since only one cell (i.e. only one global virtual address space) is used local protection is not required. Thus, the local-to-global translator would not need to generate any local protection at this point and the local protection portion of the cell would not be used.

Global virtual-to-physical address translator 130 is implement the same as translator 110 except that bus widths are increased to accommodate translation of the higher order 58 bits of the global virtual address. It should be apparent that the match, mask, and XOR values are also increased to 58 bits.

As shown in FIG. 2, translator 110 has multiple cells 1-4 each cell having its own unique set of match, mask, XOR and protection registers—each defining a different mapping and consequently a global virtual memory space having its own set of addresses. The match, mask, XOR and protection registers used with translator 110 are stored in a memory buffer referred to as the local TLB. Similarly, the match, mask, XOR, and protect registers used for translator 130 are stored in a global TLB.

Figure 3:
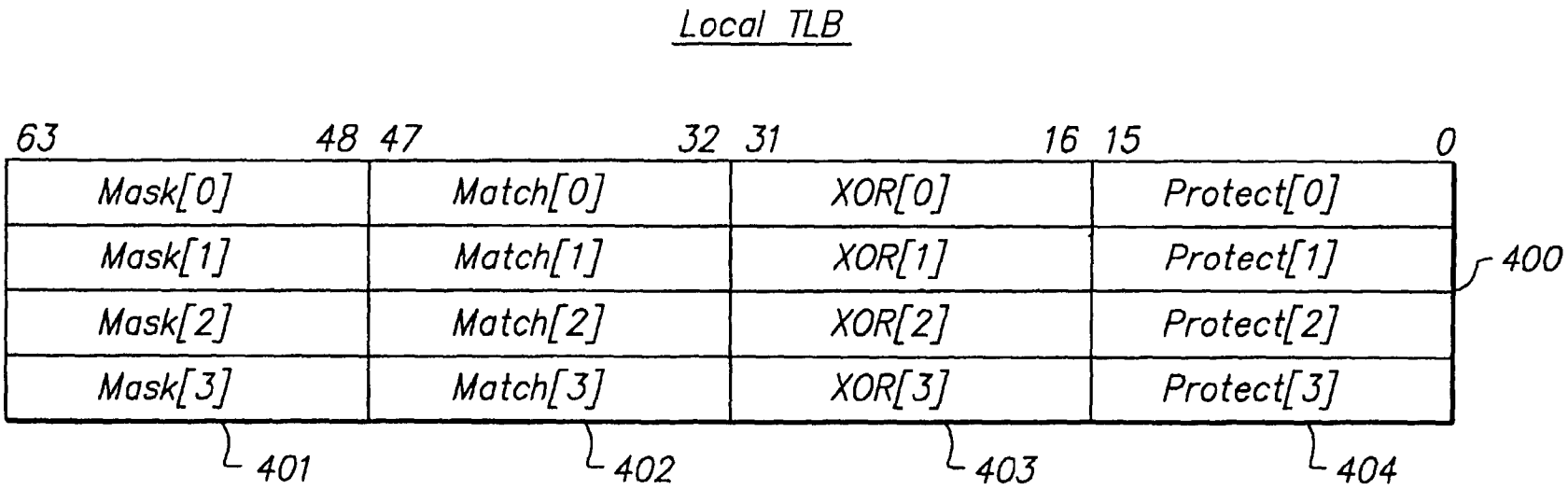
FIG. 3 illustrates an embodiment of the local TLB of the present invention.

FIG. 3 illustrates four entries in a local TLB corresponding to each of the cells in the translator illustrated in FIG. 2. In one embodiment, each entry is a 64 bit word having four fields; the mask field 401, the match field 402, the XOR field 403, and the protect field 404. As can be seen in FIG. 3, a different entry is used for each cell. For example, Mask[1], Match [1], XOR[1], and Protect[1] are all used by cell 1 (FIG. 2). Similarly, Mask[2], Match [2], XOR[2], and Protect[2] are all used by cell 2.

The global TLB is similarly structured, having a different field for each of the mask, match, XOR and protect values. In other embodiments of the present invention, the number of entries in the global TLB range from 64 to 256.

Protection Information

Figure 4:
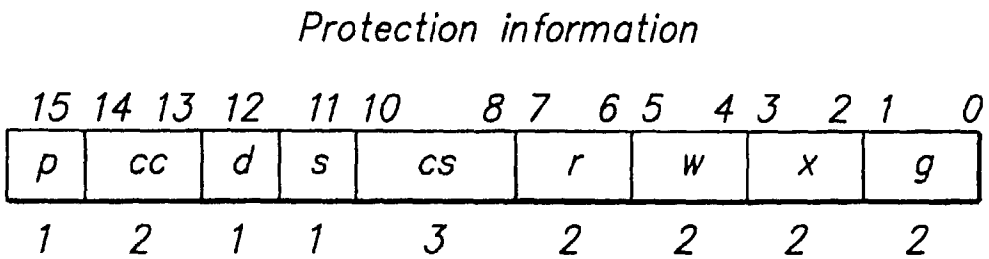
FIG. 4 illustrates an embodiment of a protection field utilized to provide protection information in the virtual memory system of the present invention.

As described above, each of the local and global TLBs generate protection information by passing the contents of the cells protection register 404 (FIG. 2) from the selected cell to OR gate 570 and then to the CPU (FIGS. 1 and 2). A portion or all of the protection information is also concatenated onto the cache tag index for both the data and instruction caches (FIG. 7). The protection information field is stored within each of cache tags 112 and 122 and is concatenated onto the cache tag when these caches are accessed. FIG. 4 illustrates one embodiment of the protection information field of the present invention. As can be seen the 16 bit protection field comprises many sub-fields. The sub-fields define different aspects of a given address's ability to access data and modify it. Since the present invention's virtual memory system is particularly useful when utilized in a computer system employing multiple processors and multiple caches it is necessary to provide information to ensure that the data stored in each of the caches and the main memory are consistent. This is also referred to as maintaining cache coherency. Fields cs and cc are used to ensure cache coherency. The cc field (cache control) defines the different states (i.e. cached, coherent, noallocate, physical) of the data stored at the address being accessed and the cs field (coherence state) defines what may be done to the data when it is accessed (read, write, or replace). The p field defines the scheduling priority with which the memory access is to be handled, so that high-priority memory accesses may be performed earlier in preference to low-priority memory accesses. The d field defines that a particular exception is to be taken when accesses occur to memory controlled by this field, called a detail exception. The s field defines whether the access is to be strongly or weakly ordered with respect to other memory accesses.

The d field, when set causes a detail exception to take place. This exception passes control to a software routine which may use a variety of methods to further determine whether an exception should be handled or suppressed for this particular memory reference. For example, it may determine from the virtual address which bytes within a memory block are to be accessed, and consult a bit-map for each byte as to whether the particular type of access is to proceed. In this manner, access may be controlled at the byte level. In order to suppress the handling of the exception, the software routine sets system state which is preserved only until the target instruction is re-executed upon returning from the exception handler. The system state is then reset so that detail exceptions may occur on the next successive instruction and particularly upon any further re-execution of the same instruction as may occur after a branch operation.

The r, w, x, and g fields define the minimum privilege level of the access being performed. In one embodiment of the present invention, each field is two bits wide thus allowing for four levels of privilege for each type of access (i.e. minimum privilege=3 and maximum privilege=0). The r field indicates the access privilege level for a read access, the w field indicates the privilege level for a write access, the x field indicates the privilege level for an execute access and the g field indicates the privilege level for a gateway access. A higher privilege level can always access a memory space having a lower privilege level, but a lower privilege level cannot access data stored at a higher privilege level unless a gateway access is specified.

It should be noted that since the cache coherency information in addition to access privilege level is provided for at the local virtual, global virtual and physical memory level, cache coherency is maintained throughout the virtual memory system of the present invention at each of these levels.

Gateway Accesses

Gateway accesses provide a means of accessing high privileged areas of memory in a very controlled manner. For instance, it may be desired to protect certain types of routines, such as operating system software, in a more robust manner than other software routines stored in memory. To provide this protection, the system software is stored in an area of memory (physical or virtual) having the highest privilege level where accesses only having that privilege level is able to access the system software. Further access control to this area is imposed by ensuring that lower types of accesses are only allowed to access this high privileged area by passing through a gateway. The gateway controls the specific entrance and exit points into the privileged memory area.

Gateway accesses are implemented with gateway pointers which are 128 bits of data providing two pointers. The first pointer gives the memory address of where the higher priority area of memory is to be entered. The second pointer is 64 bits of data that can be used for a general purpose, but has the special characteristic that it is loaded as the gateway is entered and that the target procedure may depend upon it being properly loaded into a particular general register of the processor. Because of this characteristic, it is normally loaded with a pointer to a data region to be employed by the target procedure.

Figure 5A:
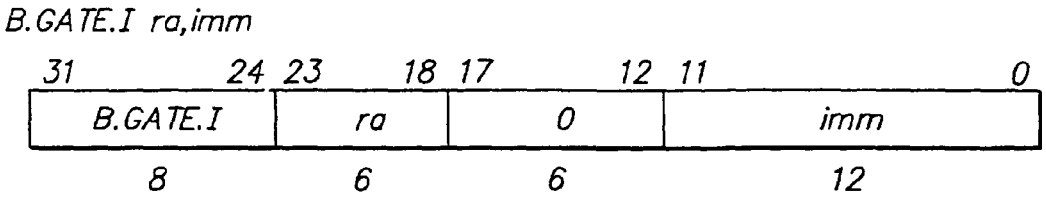
FIG. 5 illustrates an embodiment of the gateway instruction of the present invention.
Figure 5B:
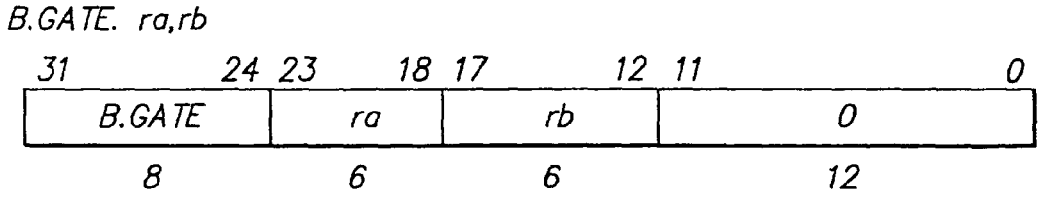

Gateways are implemented by the gateway instruction of the present invention. FIGS. 5A and 5B illustrate two formats of gateway instructions of the present invention.

The Branch: Gateway: Immediate (B.GATE.I) Operation

The B.GATE.I operation, provides a secure means to call a procedure, including those at a higher privilege level. The operation code for the gateway instruction format shown in FIG. 5A is shown below:

Operation Code

| | |
|---|---|
| B.GATE.I | Branch gateway immediate |

For the instruction format shown in FIG. 5A, a virtual address of the gateway pointer is computed from the sum of the contents of register ra and the sign-extended value of the 12-bit immediate field. The contents of 16 bytes of memory using the little-endian byte order is fetched. A branch and link occurs to the low-order octlet (i.e. eight bytes) of the memory data, and the successor to the current program counter, catenated with the current execution privilege is placed in register 0 (FIG. 5A). The privilege level is set to the contents of the low-order two bits of the memory data. Register 1 is loaded with the high-order octlet of the memory data.

An access disallowed exception occurs if the new privilege level is greater than the privilege level required to write the memory data, or if the old privilege level is lower than the privilege required to access the memory data as a gateway. Furthermore, an access disallowed exception occurs if the target virtual address is a higher privilege than the current level and gateway access is not set for the gateway virtual address, or if the access is not aligned on a 16-byte boundary. A reserved instruction exception occurs if the rb field is non-zero.

The following is a definition in terms of an algorithm showing the operations performed to implement the B.GATE.I instruction of the present invention.

Definition

```
def BranchGatewayImmediate(ra,rb,imm) as
  a←RegRead(ra, 64)
  VirtAddr←a+(imm_11^52 ||imm)
  if VirtAddr_3..0≠0 then
    raise AccessDisallowedByVirtualAddress
  endif
  if rb≠0 then
    raise ReservedInstruction
  endif
  b←LoadMemory(VirtAddr,128,L)
  bx←b_127..64 || ProgramCounter_63..2+1 || PrivilegeLevel
  ProgramCounter←b_63..2 || 0^2
  PrivilegeLevel←b_1..0
  RegWrite(rb, 128, bx)
enddef
```

Exceptions

Reserved Instruction
Access disallowed by virtual address
Access disallowed by tag
Access disallowed by global TLB
Access disallowed by local TLB
Access detail required by tag
Access detail required by local TLB
Access detail required by global TLB
Cache coherence intervention required by tag
Cache coherence intervention required by local TLB
Cache coherence intervention required by global TLB
Local TLB miss
Global TLB miss Branh Gateway Operation This operation provides a secure means to call a procedure, including those at a higher privilege level. The operation code for the gateway instruction format shown in FIG. 5B is shown below:

Operation Codes

| | |
|---|---|
| B.GATE | Branch gateway |

For the instruction format shown in FIG. 5B, a virtual address of the gateway pointer is computed from the sum of the contents of register ra and register rb. The contents of 16 bytes of memory using the little-endian byte order is fetched. A branch and link occurs to the low-order octlet of the memory data, and the successor to the current program counter, catenated with the current execution privilege is placed in register 0. The privilege level is set to the contents of the low-order two bits of the memory data. Register 1 is loaded with the high-order octlet of the memory data.

An access disallowed exception occurs if the new privilege level is greater than the privilege level required to write the memory data, or if the old privilege level is lower than the privilege required to access the memory data as a gateway. An access disallowed exception occurs if the target virtual address is a higher privilege than the current level and gateway access is not set for the gateway virtual address, or if the access is not aligned on a 16-byte boundary. A reserved instruction exception occurs if the rb field is non-zero.

The following is a definition in terms of an algorithm showing the operations performed to implement the B.GATE instruction of the present invention.

Definition

```
def BranchGateway(ra,rb,rc) as
  a←RegRead(ra, 64)
  b←RegRead(rb, 64)
  VirtAddr←a+b
  if VirtAddr_3.0≠0 then
    raise AccessDisallowedByVirtualAddress
  endif
  if rc≠0 then
    raise ReservedInstruction
  endif
  c←LoadMemory(VirtAddr,128,L)
  cx←c_127..64 || ProgramCounter_63..2+1 || PrivilegeLevel
  ProgramCounter←c_63.22 ||0
  PrivilegeLevel←c_1..0
  RegWrite(rc, 128, cx)
enddef
```

Exceptions

Figure 6:
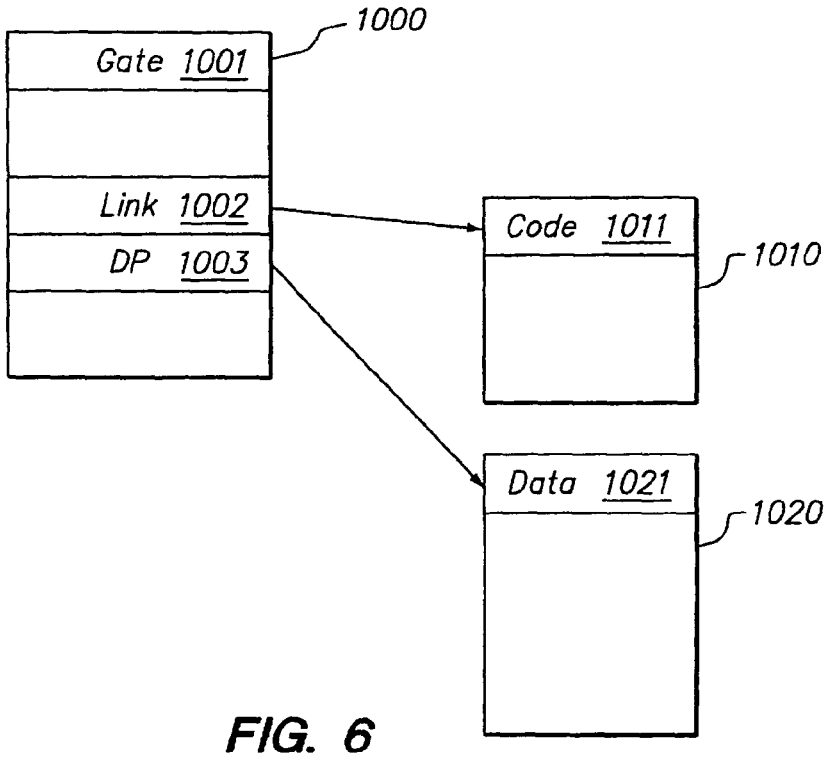
FIG. 6 illustrates the manner in which gateways are implemented in an embodiment of the present invention.

Reserved Instruction
Access disallowed by virtual address
Access disallowed by tag
Access disallowed by global TLB
Access disallowed by local TLB
Access detail required by tag
Access detail required by local TLB
Access detail required by global TLB
Cache coherence intervention required by tag
Cache coherence intervention required by local TLB
Cache coherence intervention required by global TLB
Local TLB miss
Global TLB miss FIG. 6 illustrates the manner in which gateways are implemented in one embodiment of the present invention. Register 1001 corresponds to the address location of the gateway instruction in virtual memory. The address stored in register 1001 points to the address (1002) where the 128 bit gateway pointers are stored. Link register 1002 stores index 1011 that indicates the entry point of memory area 1010 being accessed. As shown in FIG. 6, register 1002 points to address 1011 in memory area 1010. Data pointer 1003 stores the index into the designated data register 1021 within the memory area 1020.

The gateway operation includes several steps. First, the address stored at the first pointer is loaded into the CPU's program counter, causing the CPU to start fetching instructions at that address, performing the instructions, and incrementing the program counter. Further, the previous address stored in the program counter is stored in the location of the first pointer. In addition, the second pointer indicates the address of a data register that is initialized with any data needed to process the instructions. After the access operation is performed, the value stored in the first register is reloaded into the program counter so that processing can return back to its original processing location. This gateway method, i.e. 1) setting the program counter to an entry point address, 2) loading another register with the program counters previous value, and then 3) initiating a data register, reduces processing steps in comparison to prior art methods that utilize CPU status registers.

In one embodiment of the present invention a 64 bit program counter register is employed where the lower order two bits of the register correspond to the privilege level of the access and the rest of the bits make up the instruction address. At the beginning of the gateway operation, the new instruction address provided by the 128 bit gateway is loaded into the program counter register along with its corresponding new privilege level. At the end of the gateway procedure, another instruction is executed which causes the program counter to be reloaded with the return address and the old privilege level. In this way, privilege level consistency is maintained.

Cache Partitioning

Figure 8:
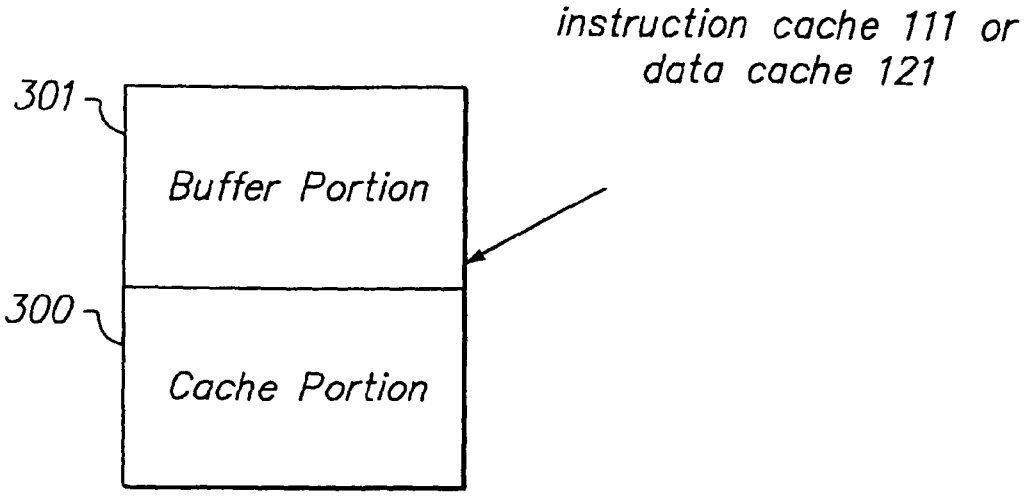
FIG. 8 illustrates a configurable cache in accordance with the system and method of the present invention.

FIG. 7 illustrates one embodiment of the memory system of the present invention in which independent local-to-global data buffers and independent cache and cache tags are employed for each of the instruction and data paths. In this embodiment, each of the instruction cache 111 and the data cache 121 may be selectively configured into a cache portion 300 and a buffer portion 301 (FIG. 8). One advantage to configuring and accessing cache 111/121 as a buffer is that buffer access times are fixed and typically short, compared to cache accesses which potentially are longer and variable due to cache misses.

Each of the cache portions 300 for each of the instruction and data caches utilizes its corresponding cache tag. For instance, the cache portion in the information cache 111 utilizes cache tag 112 and the cache portion in data cache 121 utilizes cache tag 122. When cache portion 300 of cache 111 is accessed, a portion of the instruction address that is used to access the cache portion is also coupled to cache tag 112. Buffer portion 301, on the other hand, does not make use of cache tags 112 or 122. Caches 111 and 121 are configured with 2 bits each of configuration information: instruction cache configuration (icc) information and data cache configuration (dcc) information, respectively, that are initially set in a status register when the processor is configured by software prior to running tasks.

In one embodiment of the present invention, 32K bytes of memory are utilized for each of instruction and data caches 111 and 121. In the case of instruction cache 111, when icc=0, zero bytes of cache 111 function as a cache portion and 32K bytes of cache 111 function as a buffer portion. For icc=1, cache 111 is divided into 4K bytes of a cache portion and 28K bytes of a buffer portion. For icc=2, 8K bytes are utilized as cache and 24K bytes function as buffer, and finally for icc=3, 16K bytes are cache and 16K bytes are buffer. Thus, for this embodiment, a maximum of half of the 32K bytes of cache 111 can may be used as cache and a maximum of 32K bytes of cache 111 may be used as buffer.

In addition to the configuration information, a flag bit in the instruction address ($a_{47}$, for this embodiment) is used to indicate whether the access is being performed with cache portion 300 or buffer portion 301 of either of caches 111 or 121. If $a_{47}$=1, then buffer portion 301 is accessed with the address in the instruction register and if $a_{47}$=0, cache 300 is accessed.

Figure 9:
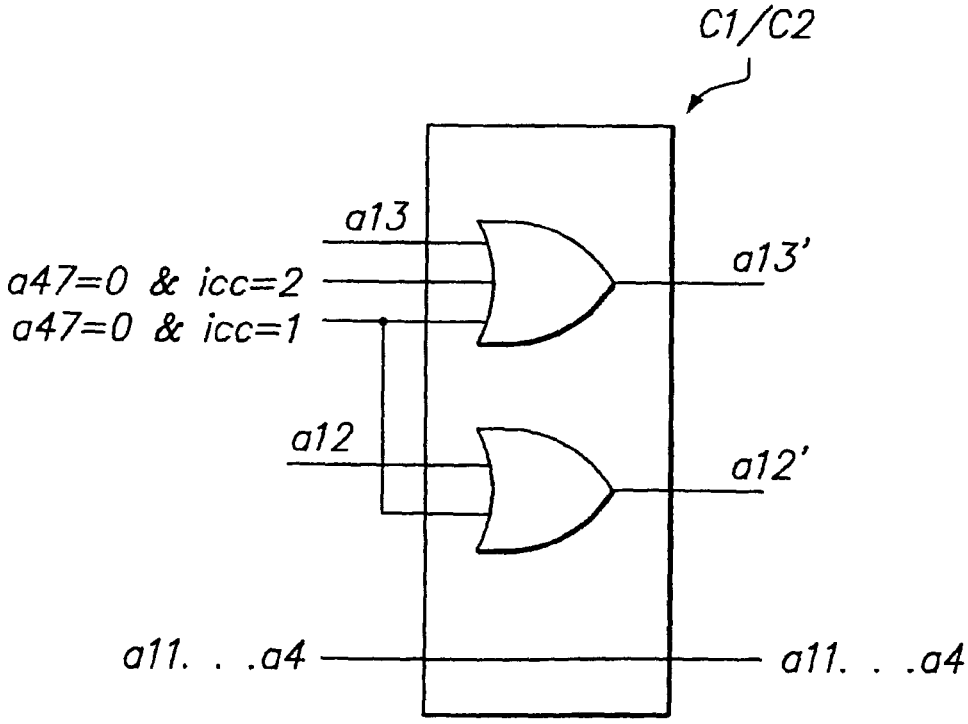
FIG. 9 shows one embodiment of a logic circuit employed in the system of the present invention to translate cache addresses for accessing the configurable cache of the present invention.

In the embodiment shown in FIG. 7, address bits $a_{47}$-$a_0$ are used to access data and instruction caches 111 and 121. Since the size of each of the cache and buffer portions for each of caches 111 and 121 is selectable, address bits $a_{14}$-$a_0$ must be modified respective of the selected sizes of each of portions 300 and 301. Address bits $a_{14}$-$a_0$ are coupled to C1 (FIG. 7) in the case of the instruction cache 111 and C2 in the case of the 15 data cache 121. C1 and C2 (shown in detail in FIG. 9) translate addresses $a_{14}$-$a_0$ depending on the configuration indicators icc and dcc, respectively. In the case in which $a_{47}$=1, bits $a_{14}$-$a_0$ are not modified and are always directly coupled to buffer portion 301 no matter what icc is equal to. Similarly, for $a_{47}$=0 and icc=0 cache 111 or 121 is configured such that there are zero bytes of cache portion 300 and 32K bytes of buffer portion 301. As a result, $a_{14}$-$a_0$ are again directly coupled to cache 111 or 121 without modification. In the case in which $a_{47}$=0 and icc=3, 16K bytes of cache portion 300 are being accessed. As a result, $a_{14}$ is set to 1 before coupling bits $a_{14}$-$a_0$ to the cache. When $a_{47}$=0 and icc=2, 8K bytes of cache portion 300 are being accessed and $a_{14}$ and $a_{13}$ are set to 1 before coupling bits $a_{14}$-$a_0$ to the cache. Finally, if $a_{47}$=0 and icc=1, 4K bytes of cache portion 300 are being accessed and $a_{14}$, $a_{13}$, $a_{12}$ are set to 1 before coupling bits $a_{14}$-$a_0$ to the cache 111 or 121.

In one embodiment of the present invention the cache portion is divided into blocks of 64 bytes. Thus, in the case of the maximum cache portion size condition (i.e. icc=3) 16K bytes of the cache portion, is divided into 256 blocks of 64 bytes each. In order to access each of the 256 blocks, eight address bits are needed to access each cache entry (i.e. $2^8$=256). In the embodiment shown in FIG. 7, instruction address bits $a_{13}$-$a_6$ are coupled to the cache tag when the cache portion is being accessed.

Boundary Crossing Detector

The present invention also stores static information indicating the minimum page size of the memory. For the embodiment shown in FIG. 7, a 5-bit field of data designates the page size. The page size is set by system software and is determined by the number of bits that are always masked in the global TLB when performing address translation. For instance, if the lower order ten bits are masked in each cell of the global TLB, the page size is 1024 words of data.

In one embodiment of the present invention, portions of the local-to-global virtual address translator is shared between the instruction path and the data path. The main translator is located in the data path as block 120, and the instruction translator 110 is loaded upon demand from the data translator 120. Consequently, the number of entries in instruction translator 110 need not be as large as that of data translator 120. In one embodiment, the instruction translator 110 holds a single entry. The single entry is loaded from the data translator 120 whenever either a branch operation occurs or a page boundary is crossed. In one embodiment, the single entry further may eliminate the masking and matching portions of the entry, thus consisting only of XOR data or the global virtual address which is coupled to address 102.

When the information cache 111 is accessed as a cache portion ($a_{47}$=0), cache tag 112 is simultaneously accessed and provides previously cached protection information to the processor on bus 135 to multiplexer 154, (FIG. 7). In the case when cache 111 is accessed as a buffer portion ($a_{47}$=1) and the cache tag is not used, protection information buffer 150 provides the appropriate protection information on bus 156 to multiplexer 154, (FIG.7). Instruction address bit a47 which indicates whether instruction cache 111 is configured as a buffer or a cache controls multiplexer 154 so that it passes the correct protection information to the CPU. Protection information 160 (FIG. 7) is loaded into the protection information buffer from the global translator 130 whenever either a branch operation occurs or a page boundary is crossed.

Boundary crossing detector 151 functions to evaluate whether a page boundary is potentially crossed by detecting a carry in certain bits in the instruction address, (bits $a_{31}$-$a_6$ in this embodiment) as controlled by the minimum page size. When the instruction address indicates that a boundary is potentially being crossed or the instruction corresponds to a branch operation, OR gate 152 outputs a reload buffer signal indicating that the protection information provided on bus 153 from the global TLB for that particular instruction is to be loaded into instruction protection buffer 150.

Protection information buffer 150 is used when translating consecutive addresses, such as instruction addresses. For instance, when an instruction address is first translated by local-to-global TLB 110 and then translated by global-to-physical TLB 130, protection information is provided to the processor by the global TLB. For the previously described embodiment shown in FIG. 1, if the next instruction address to be translated is consecutive with respect to the previous address it will also be translated through the local and global TLBs. Since the consecutive address has all of the same higher order address bits as the previously translated address the global TLB would provide the same protection information as that of the previously translated address.

In the embodiment of the present invention shown in FIG. 7, protection information buffer 150 provides a means of by-passing the step of translating consecutive addresses through the global TLB to obtain the protection information as is done in the FIG. 1 embodiment of the present invention. Instead, protection information 160 from the previously translated address is loaded in protection information buffer 150 when a boundary is detected and it is transmitted to the CPU when the consecutive address is being translated if 1) $a_{47}=1$, i.e. the buffer portion of instruction cache 111 is being accessed and 2) a given number of higher order bits (as specified by the minimum page size) in the local virtual address match the same given number of higher order bits in the local virtual address of the previously translated address.

The virtual memory of the present invention may be implemented in a computer system having multiple simultaneous threads of execution—referred to as a superthreaded or multithreaded computer system. The computer system is designed such that it employs a different copy of the register file, the local-to-global TLB, the data and instruction caches and the protection information buffer for each thread and only one data cache, instruction cache and global-to-physical TLB for all threads. Consequently, each of the threads of the machine may correspond to different tasks that operate independently and may be protected from each other. Data may be shared or maintained independently between each thread using the virtual memory system of the present invention since each thread has a distinct version of the local-to-global TLB so that they may use the same address to mean different things, or may use the different addresses to mean the same thing, or may use the same address to reference the same memory, depending on the settings of the local-to-global translators.

Thus, a virtual memory system utilizing local virtual and global virtual addresses is described. Although the elements of the present invention have been described in conjunction with a certain embodiment, it is appreciated that the invention may be implemented in a variety of other ways. Consequently, it is to be understood that the particular embodiment shown and described by way of illustration are in no way intended to be considered limiting. Reference to the details of these embodiments is not intended to limit the scope of the claims which themselves recite only those features regarded as essential to the invention.

I claim:

[1. A memory storage system for storing recently accessed data from a main memory in a computer system, said memory storage system comprising:

a memory storage area which is configurable into a cache portion and a buffer portion; and means for storing indices corresponding to data stored in said memory storage area;

wherein when said cache portion is accessed by a given address, said index storage means is also accessed by said address to check if said data accessed from said cache portion is valid and when said buffer portion is accessed by said given address, said index storage means is not checked.]

[2. The memory system as described in claim 1 wherein said index storage means further includes protection information indicating the access privilege of said given address into said main memory and when said index storage means is accessed by said given address, said protection information is concatenated onto an address accessed from said index storage means by said given address and provided to a CPU.]

[3. The memory system as described in claim 2, wherein said protection information includes a field that defines a coherence state of data stored at said given address, wherein said coherence state indicates whether data stored at said given address may be read, written into, or replaced.]

[4. The memory system as described in claim 2 wherein said protection information includes a field that defines an access priority of said given address, wherein said access priority indicates the order at which said given address is accessed with respect to other accesses in said memory system.]

[5. The memory system as described in claim 2 wherein said protection information includes a field for indicating when a detail exception should occur.]

[6. The memory system as described in claim 2 wherein said protection information includes a field that defines a cache control condition of said given address, wherein said cache control condition indicates states of said data stored in said given address including a cache coherent state, a non-allocated state, and a physical state.]

[7. The memory system as described in claim 1, wherein said given address includes an indication of whether an access is being performed on at least one of said cache portion and said buffer portion.]

[8. A method for storing recently accessed data from a main memory in a computer system, comprising the steps of:

configuring a memory storage area into a cache portion and a buffer portion; and storing indices corresponding to data stored in said memory storage area;

wherein when said cache portion is accessed by a given address, said stored indices are also accessed by said given address to check if said data accessed from said cache portion is valid and when said buffer portion is accessed by said given address, said stored indices are not checked.]

[9. The method of claim 8, wherein said given address includes an indication of whether an access is being performed on at least one of said cache portion and said buffer portion.]

[10. The method of claim 9, wherein said protection information includes a field that defines a coherence state of data stored at said given address, wherein said coherence state indicates whether data stored at said given address may be read, written into, or replaced.]

[11. The method of claim 9, wherein said protection information includes a field that defines an access priority of said given address, wherein said access priority indicates the order at which said given address is accessed with respect to other accesses in said memory system.]

[12. The method of claim 9, wherein said protection information includes a field for indicating when a detail exception should occur.]

[13. The method of claim 9, wherein said protection information includes a field that defines a cache control condition of said given address, wherein said cache control condition indicates states of said data stored in said given address including a cache coherent state, a non-allocated state, and a physical state.]

[14. The method of claim 8, wherein said stored indices further include protection information indicating the access privilege of said given address into said main memory and when said stored indices are accessed by said given address, said protection information is concatenated onto an address accessed from said stored indices by said given address and provided to a CPU.]

[15. A computer-readable medium containing a program that performs the steps of:

receiving an indication that a memory storage area has been configured into a cache portion and a buffer portion; and storing indices corresponding to data stored in said memory storage area;

wherein when said cache portion is accessed by a given address, said stored indices are also accessed by said given address to check if said data accessed from said cache portion is valid and when said buffer portion is accessed by said given address, said stored indices are not checked.]

[16. The method of claim 15, wherein said given address includes an indication of whether an access is being performed on at least one of said cache portion and said buffer portion.]

[17. The computer-readable medium of claim 16, wherein said protection information includes a field that defines a coherence state of data stored at said given address, wherein said coherence state indicates whether data stored at said given address may be read, written into, or replaced.]

[18. The computer-readable medium of claim 16, wherein said protection information includes a field that defines an access priority of said given address, wherein said access priority indicates the order at which said given address is accessed with respect to other accesses in said memory system.]

[19. The computer-readable medium of claim 16, wherein said protection information includes a field for indicating when a detail exception should occur.]

[20. The computer-readable medium of claim 16, wherein said protection information includes a field that defines a cache control condition of said given address, wherein said cache control condition indicates states of said data stored in said given address including a cache coherent state, a non-allocated state, and a physical state.]

[21. The computer-readable medium of claim 15, wherein said stored indices further include protection information indicating the access privilege of said given address into said main memory and when said stored indices are accessed by said given address, said protection information is concatenated onto an address accessed from said stored indices by said given address and provided to a CPU.]

*22. A method of storing data accessed by a processor, the method comprising:*

*receiving configuration information;*

*accessing a main memory;*

*partitioning a memory storage area into one of a predetermined number of combinations of a cache portion size and a buffer portion size in accordance with the received configuration information;*

*receiving an address within an address space divided into a cache address space portion and a buffer address space portion, wherein the address includes a field for indicating whether an access includes a cache access or a buffer access;*

*modifying at least a portion of the address using the configuration information, to produce a modified address; and*

*accessing data in said memory storage area by means of the modified address.*

*23. The method of claim 22 further comprising:*

*if a cache miss is detected in an access to the cache portion, accessing the main memory for transferring data to or from the main memory,*

*wherein an access to the buffer portion does not result in an access to the main memory.*

*24. The method of claim 22 further comprising:*

*storing indices corresponding to data stored in the memory storage area in a cache tag memory;*

*upon accessing the cache portion, checking the cache tag memory to determine whether the cache tag memory contains an index corresponding to the cache access; and*

*generating a cache hit if a corresponding index is found, and generating a cache miss if a corresponding index is not found.*

*25. The method of claim 22 wherein, in an access to the cache portion, the memory storage system determines whether an access to the main memory is required, and in an access to the buffer portion, no access to the main memory is required.*

*26. The method of claim 22 wherein buffer accesses have a fixed access time and cache accesses have a variable access time due to cache misses.*

*27. The method of claim 22, wherein an address bit in said address indicates whether the access is a cache access or a buffer access.*

*28. The method of claim 22 further comprising:*

*partitioning the memory storage area between the cache portion and the buffer portion in accordance with configuration information received by the memory storage system.*

*29. The method of claim 22 further comprising:*

*setting the configuration information in a status register when the computer system is configured by software.*

*30. The method of claim 22 further comprising:*

*allocating address ranges to the cache portion and the buffer portion in accordance with the partitioning of the memory storage area between the cache portion and the buffer portion.*

*31. The method of claim 22 wherein the address space is divided into a cache address space portion and a buffer address space portion in accordance with at least the state of an address bit within the address space.*

*32. The method of claim 22 further comprising:*

*delivering a portion of the address to the memory storage area without modification.*

*33. The method of claim 22 further comprising:*

*delivering the modified address to the cache portion.*

*34. The method of claim 22 wherein the modified address is used to access the entire memory storage area for accesses within the buffer address space portion.*

*35. A method of storing data accessed by a processor, the method comprising:*

*accessing a main memory;*

*receiving configuration information;*

*configuring a memory storage area into a cache portion and a buffer portion by partitioning the memory storage area between the cache portion and the buffer portion in accordance with the configuration information into one of a predetermined number of combinations of cache portion size and buffer portion size in accordance with configuration information received by the memory storage system;*

*receiving an address within an address space divided into a cache address space portion and a buffer address space portion;*

*modifying at least a portion of the address using the configuration information, to produce a modified address; and*

*accessing data in said memory storage area by means of an address that includes a field for indicating whether the access includes a cache access or a buffer access.*

*36. The method of claim 35 further comprising:*

*delivering a portion of the address to the memory storage area without modification.*

*37. The method of claim 35 further comprising:*

*delivering the modified address to the cache portion.*

*38. The method of claim 35 wherein the modified address is used to access the entire memory storage area for accesses within the buffer address space portion.*

* * * * *